3,232,702
SELECTIVE REMOVAL OF BORON
COMPOUNDS FROM SILANE
Earl G. Caswell, Danville, Ind., and Robert A. Lefever, Bon Air, Va., assignors to Union Carbide Corporation, a corporation of New York
No Drawing. Filed Sept. 24, 1958, Ser. No. 762,925
10 Claims. (Cl. 23—204)

The present invention relates to a method for the purification of silane and, more particularly, the removal of impurities such as boron compounds from silane.

Silicon metal is useful in various electronic applications, such as transistors and solar batteries; silicon metal must be quite pure in order to be used in this fashion.

One known method for the preparation of silicon is thermal decomposition of silane ($SiH_4$). Silicon obtained by this thermal decomposition method tends to be of poor crystalline quality and low resistivity due to impurities normally present in the silane raw material; the most deterimental and prevalent impurities generally are boron compounds. Silicon obtained by this method is generally unsuitable, without further treatment, for use in semi-conductor devices such as transistors, rectifiers and solar batteries.

In order to obtain silicon that has a more uniform composition and an increased resistivity, thereby making it suitable for use in semi-conductor devices, a further purification of silicon obtained by the thermal decomposition of silane is necessary.

Recrystallization of the silicon is one such expedient employed to further purify silicon. By this method, a crystal is pulled from a silicon melt. This crystal is then melted and recrystallized to segregate and remove impurities.

However, if the contaminants in silane can be removed prior to the thermal decomposition of silane to silicon rather than employing an expedient such as recrystalization of the silicon after silane decomposition, considerable time and effort can be saved.

It has been found that the most undesirable impurities in silane are usually varying amounts of hydrides of boron, arsenic and phosphorus, depending on the method of preparation. These impurities are difficult to remove by techniques such as vaporization since both the silane and these impurities are quite volatile. Of these impurities, boron hydride is the most difficult to remove and any process directed to the purification of silane is concerned primarily with the elimination of this substance.

It is an object of the present invention to provide a method for obtaining silane substantially free from boron impurities.

It is a further object of the present invention to provide a method for obtaining substantially boron-free silane suitable for decomposition to silicon, which has a condition of purity which permits direct use in the preparation of silicon crystals having the improved properties that are necessary for use in semi-conductor devices.

Other aims and advantages of the invention will be apparent from the following description and appended claims.

In accordance with the present invention, a process is provided which comprises contacting unpurified silane with finely-dispersed particles of a reactive metal to form a complex compound between the finely-divided metal and the impurities in the silane and then separating the silane from such complex compound. This reactive metal is selected from the class of alkali and alkaline earth metals, consisting of lithium, rubidium, potassium, cesium, barium, strontium, calcium, magnesium and sodium. This novel method has shown the distinct advantages of providing a means for (a) selective removal of volatile impurities, (b) quantitative removal of the impurities, and (c) no substantial decomposition of the silane as a result of the purification process.

For the purpose of illustration, the method employed in the present invention will be described in reference to the removal of diborane, the simplest boron hydride, from a silane mixture by forming a non-volatile complex compound with sodium. The following equation is representative of the formation of a sodium complex compound upon contacting a boron hydride molecule in the method of the invention:

$$B_2H_6 + 2Na \rightarrow B_2H_6 \cdot 2Na$$

The molar ratio of sodium to diborane should thus be at least 2 to 1 to effect complete removal of the latter from a silane-diborane mixture.

The finely-dispersed reactive metal, such as sodium, can be employed in several forms in the present process. A sodium amalgam can be used to obtain finely-dispersed sodium after which the silane is passed through the amalgam. The sodium amalgam could itself be finely-dispersed on an inert carrier medium. Preferably, the reactive metal alone is dispersed on an inert carrier medium such as an adsorbent. Among the typical absorbents are such as natural and synthetic crystalline zeolites, activated charcoal, silica gel, activated alumina and porous clays.

The synthetic zeolites referred to above, such as crystalline zeolite molecular sieves, are preferred as the carrier medium for the finely-dispersed reactive metal. Several forms of these zeolites are described in the Journal of the American Chemical Society, 78, 2338, 5963 and 5972 (1956). In general, these zeolites have three-dimensional structures containing uniformly sized interstitial pores of molecular dimensions. By this arrangement the reactive metal or amalgam can be adsorbed into the pores and thus be conveniently dispersed to provide an extremely high surface area for reaction with impurities in the silane. The natural form of these crystalline zeolites is typified by such materials as faujasite, wellsite, and chabazite, whereas the synthetic form is typified by metal aluminum silicates known as Zeolite A, fully described in U.S. Patent No. 2,882,243 filed on December 24, 1953 and Zeolite X, fully described in U.S. Patent No. 2,882,244 filed on December 24, 1953. The synthetic zeolites are distinguished from natural materials both by crystal structure and chemical composition.

According to the preferred practice of the present invention, the pores of a crystalline zeolite mentioned above are provided with a filler or loading material of sodium as the active metal by which the complex $B_2H_6 \cdot 2Na$ compound is formed when exposed to unpurified silane.

This form of loaded crystalline zeolite is fully described in the co-pending application entitled Metal Loaded Molecular Sieves, C. R. Castor, Serial No. 762,-957, filed September 24, 1958, now Patent No. 3,013,986.

An example of a method for preparing such zeolites includes the following:

29 grams of activated sodium Zeolite X were heated to 125° C. Four grams of metallic sodium were added with stirring in a nitrogen atmosphere. The sodium (melting point 97.5° C.) melted and dispersed evenly throughout the sodium Zeolite X, yielding a product with a jet black color. X-ray diffraction showed no destruction of the sodium Zeolite X crystal structure.

In another method of preparation, 100 grams of activated sodium Zeolite X were charged to a flask and heated to 200° C. in an inert atmosphere. Lithium metal in ribbon form was added in small portions of about .3 to about .4 grams with continuous stirring of the mixture until about 3 grams of lithium had been added in a period of about 2½ hours. The stirring was continued for an additional hour. The X-ray diffraction data for the gray colored product indicated that the crystal structure of sodium Zeolite X was retained. The product was added to water and a gas, apparently hydrogen, was evolved.

It is to be noted that in the process of this invention, temperature and pressure are not critical in forming the impurity complex compound, however, silane containing impurities should preferably be in the gaseous state during the purification step for ease in handling and for rapid reaction with the purifying agent. A suitable temperature range lies between the temperature at which silane boils, −112° C. and its decomposition temperature, about 400° C.

Atmospheric pressure or pressures above atmospheric can be used. When the reactive metal is dispersed on an adsorbent carrier, it is preferred to operate at pressures below atmosphere so as to minimize adsorption of the silane.

It can thus be seen that a preferred practice of this invention comprises contacting vaporized unpurified silane with a dispersed sodium metal and then separating the gaseous silane from the non-volatile sodium-impurity complex compound contained within the pores of the zeolite.

In the following illustrative example, diborane was selectively adsorbed from a silane-diborane mixture by use of a finely-dispersed sodium amalgam contained within a Zeolite X structure.

In preparing the adsorbent bed, about 17 grams of sodium Zeolite X were placed in a glass tube to form a zeolite column 9 cm. long and 20 mm. in diameter. About 0.26 grams of sodium were placed in a tube connecting to the zeolite column. The zeolite thus prepared was surrounded by a furnace and heated for about 16 hours at 370–400° C. under vacuum to remove adsorbed water.

The furnace was then lowered to surround both the zeolite and the sodium containing tube. The temperature of the system eventually stabilized at about 500° C. in the sodium zone and slightly higher in the zeolite zone, during this additional heating period of about 16 hours, the furnace was kept at about 450–500° C.

About 1.3 grams of mercury were next placed in the bottom of the zeolite column and heated at 100–150° C. under vacuum. The mercury vapor thus emitted entered the zeolite bed to form a sodium amalgam within the porous structure thereof.

In preparing the gaseous mixture to be purified, silane and diborane were added to a container so that the partial pressure of silane was about 158 mm. of mercury, and that of the diborane about 64 mm. of mercury. This gaseous mixture was passed through the above prepared sodium amalgam-containing zeolite bed.

The flow of gas having passed through the zeolite bed was then collected, measured, and found to have a vapor pressure of 152 mm. mercury, which was substantially that of the silane starting pressure. The diborane thus appeared to be quantitatively removed.

It may be readily seen that with the so purified silane, it is possible then to thermally decompose it and obtain silicon metal adaptable to use on apparatus requiring high silicon resistivity such as transistors and solar batteries.

What is claimed is:

1. Method for removing boron containing impurities from silane which comprises contacting unpurified vaporized silane with finely-dispersed particles of a reactive metal chosen from the group consisting of alkali, and alkaline earth metals to form a complex compound between said reactive metal and the boron containing impurities, and selectively removing said complex compound from the boron free silane.

2. Method for removing boron containing impurities from silane which comprises contacting vaporized boron containing silane with particles of a reactive metal chosen from the group consisting of alkali, and alkaline earth metals finely dispersed on an inert carrier element, forming on the carrier element a complex compound between said reactive metal and the boron impurity, and selectively removing said complex compound from the boron free silane.

3. Method for removing boron containing impurities from silane which comprises contacting vaporized boron containing silane with particles of a reactive metal chosen from the group consisting of alkali, and alkaline earth metals finely dispersed within an adsorbent carrier element, forming within the carrier element a complex compound including said reactive metal and the boron impurity, and selectively adsorbing said complex compound from the boron free silane.

4. Method for removing boron containing impurities from silane which comprises contacting vaporized boron containing silane with particles of a reactive alkali metal finely dispersed within an adsorbent carrier element, forming within the carrier element a complex compound including said reactive metal and the boron impurity, selectively adsorbing said complex compound from the boron free silane.

5. The method for removing boron impurities from silane substantially as described in claim 4 where the reactive metal is sodium.

6. Method for removing boron containing impurities from silane substantially as described in claim 4 where the adsorbent carrier element is a synthetic crystalline zeolite molecular sieve material.

7. Method for removing boron containing impurities from silane substantially as described in claim 4 where the adsorbent carrier element is synthetic crystalline Zeolite A.

8. Method for removing boron containing impurities from silane substantially as described in claim 4 where the adsorbent carrier element is synthetic crystalline Zeolite X.

9. Method for purifying silane containing as an impurity amounts of boron hydride, which method comprises: contacting the impurity-containing silane with particles of sodium held within the interstices of a Zeolite X adsorbent carrier to form in said carrier, complex ions made up of ions of said sodium and said boron hydride, thereafter separating the complex ion laden adsorbent carrier from the boron hydride free silane.

10. Method for removing boron containing impurities from silane substantially as described in claim 9 where the molar ratio of soduim to boron hydride is at least 2 to 1.

References Cited by the Examiner

UNITED STATES PATENTS

| | | | |
|---|---|---|---|
| 2,812,235 | 11/1957 | Winslow | 23—205 X |
| 2,881,234 | 4/1959 | Esmay et al. | 253—477 X |
| 2,931,709 | 4/1960 | Aries | 23—205 |

FOREIGN PATENTS

| | | |
|---|---|---|
| 22,307 | 3/1930 | Austria. |

OTHER REFERENCES

Ellis: "Hydrogenation of Organic Substances," 3rd Ed., 1930, p. 464.

Kleshchevnikova et al.: "Soviet Physics—Technical Physics," vol. 2, No. 8, pp. 1529–1532 (August 1957).

Berkman et al.: "Catalysis," 1940, pp. 463–465.

MAURICE A. BRINDISI, *Primary Examiner.*